(12) United States Patent
Torkkel

(10) Patent No.: US 9,268,713 B2
(45) Date of Patent: Feb. 23, 2016

(54) METHODS, SYSTEMS AND APPARATUS FOR MANAGING DATA ENTRIES ON A DATABASE

(71) Applicant: F-Secure Corporation, Helsinki (FI)

(72) Inventor: Juha Torkkel, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/075,249

(22) Filed: Nov. 8, 2013

(65) Prior Publication Data

US 2014/0143554 A1  May 22, 2014

(30) Foreign Application Priority Data

Nov. 16, 2012 (GB) .................................. 1220670.2

(51) Int. Cl.
*G06F 12/14* (2006.01)
*G06F 21/45* (2013.01)
*G06F 21/62* (2013.01)

(52) U.S. Cl.
CPC ............ *G06F 12/1408* (2013.01); *G06F 21/45* (2013.01); *G06F 21/62* (2013.01); *G06F 2221/2107* (2013.01)

(58) Field of Classification Search
CPC ..................... G06F 12/1408; G06F 2221/2107; G06F 21/45; G06F 21/62
See application file for complete search history.

(56) References Cited

U.S. PATENT DOCUMENTS

| 5,204,966 A * | 4/1993 | Wittenberg ........ G07C 9/00142 700/79 |
|---|---|---|
| 7,577,997 B2 * | 8/2009 | Chu .......................... G06F 8/61 719/330 |
| 7,627,152 B2 * | 12/2009 | Mathew et al. ............... 382/128 |
| 8,145,912 B2 * | 3/2012 | McLean .................. G06F 21/36 713/182 |
| 8,412,926 B1 * | 4/2013 | Gerraty ......................... 713/150 |
| 8,528,064 B2 * | 9/2013 | Nichols ................... G06F 21/41 726/5 |
| 8,867,780 B2 * | 10/2014 | Hodge .................... G06F 21/84 382/100 |
| 2007/0039042 A1 * | 2/2007 | Apelbaum ........................ 726/6 |
| 2007/0074038 A1 * | 3/2007 | Arenburg et al. ............. 713/181 |
| 2007/0220609 A1 | 9/2007 | Iwakura et al. ................. 726/26 |
| 2010/0180338 A1 * | 7/2010 | Stewart .................... G06F 21/31 726/19 |
| 2011/0099382 A1 * | 4/2011 | Grecia ......................... 713/176 |
| 2012/0011575 A1 * | 1/2012 | Cheswick et al. ................ 726/5 |
| 2012/0079282 A1 * | 3/2012 | Lowenstein et al. .......... 713/189 |
| 2012/0304284 A1 * | 11/2012 | Johnson et al. ................. 726/19 |
| 2014/0101772 A1 * | 4/2014 | Anzai ..................... G06F 21/83 726/26 |
| 2014/0325678 A1 * | 10/2014 | Kotla ...................... G06F 21/62 726/28 |

FOREIGN PATENT DOCUMENTS

EP         2 196 917 A1    6/2010
WO    WO 2012161713 A1 *  11/2012

OTHER PUBLICATIONS

GardenSec, "GardenSec-Online Security Apps," Retrieved from Archive.org, Sep. 20, 2012, pp. 1-4.*
Photoshop, "Photoshop Tutorial: How to add motion blur-Using Layers and Motion Blur Filter to create a sense of speed hereinafter Photoshop," Retrieved from Archive.org, Mar. 27, 2012, pp. 1-8.*

(Continued)

*Primary Examiner* — Kaveh Abrishamkar
*Assistant Examiner* — James J Wilcox
(74) *Attorney, Agent, or Firm* — Harrington & Smith

(57) ABSTRACT

A method for securely storing password information in a memory of a computer device. The stored password information is protected by a master password. The method includes receiving a text string corresponding to password information. The method also includes converting the text string to a media file. When the media file is passed to an output the password information is presented to a user. The method also includes storing the media file in the memory such that it is protected by the master password.

18 Claims, 6 Drawing Sheets

(56) References Cited

OTHER PUBLICATIONS

Fadiora, "Combining Optical Character Recognition (OCR) and Edge Detection Techniques to Filter Image-Based Spam," African Journal of Computing & ICT, Jan. 2012, pp. 59-68.*

Matlab, "Matlab Functions in Image Processing Toolbox", Retrieved from Archive.org, Sep. 21, 2012, pp. 1-8.*
www.gardensec.com/howto/how_to_manage_and_store_your_passwords, Internet article, 2 pgs., © GardenSec 2012.

* cited by examiner

METHODS, SYSTEMS AND APPARATUS FOR MANAGING DATA ENTRIES ON A DATABASE

TECHNICAL FIELD

The invention relates to methods, systems and apparatus for managing password information stored in a memory of a computer device. In particular, the invention relates to methods, systems and apparatus for storing and retrieving password information from a database. Further, and more specifically, the invention relates to methods, systems and apparatus for use in password management applications.

BACKGROUND

As used herein, the term "password" encompasses any information or data that is secret or specific to a user and that may be used to protect sensitive information. Passwords should not be limited to, although they can comprise, text comprising a string of alphanumeric characters. For example, passwords may additionally or alternatively comprise visual or image data, sound (e.g. voice) data or biometric data. Further, the term password may also encompass personal notes and messages that a user wishes to remain secret. Such notes or messages may be considerably longer than typical passwords.

Passwords, log-in details and other secret information (collectively termed "passwords" from now on for the sake of clarity) are of great importance for restricting access to modern "on-line" systems, for accessing secure information, e.g. a PIN for accessing a bank account, and for conducting secure communications and note taking. A problem exists in that users often have many different passwords relating to different online services and it is difficult to keep track and remember each of them.

A specific category of software applications called "password managers" is aimed at addressing this problem by providing a secure means to store passwords. Passwords can be retrieved in an on-demand basis. Typically, password manager applications store password data entries in a database, which is protected by a master password. Password manager applications are typically implemented in native binary languages for specific device such as mobile phone, tablet or traditional computer.

SUMMARY

According to the invention in a first aspect, there is provided a method for securely storing password information in a memory of a computer device. The stored password information may be protected by a master password. The method may comprise receiving a text string corresponding to password information. The method may also comprise converting the text string to media file. When the media file is passed to an output the password information may be presented to a user. The method may also comprise storing the media file in the memory such that it is protected by the master password.

Optionally, the media file may bean audio-visual composition. Optionally, the media file may be an image file. Optionally, passing the media file to an output may comprise rendering an image file to a display.

Optionally, the media file may comprise one or more of an audio file, an animation file, a motion path file and a stencil file. Presenting the password information to a user may comprise one or more of playing audio data and displaying visual data.

Optionally, storing the media file comprises storing the media file on a database, wherein access to the database requires input of the master password to the computer device.

Optionally, the image file is a bitmap file.

Optionally, protecting the media file with the master password comprises deriving an encryption key from the master password for encrypting the media file.

Optionally, derivation of the encryption key is undertaken using password based key derivation function 2.

Optionally, protecting the media file with the master password comprises deriving an encryption key from the master password, randomly generating a further encryption key, encrypting the media file using the further encryption key and encrypting the further encryption key using the derived encryption key.

Optionally, the method further comprises linearly distorting the image file before it is stored.

Optionally, the method further comprises obfuscating the media file using an obfuscation key.

Optionally, the media file is obfuscated using mathematical obfuscation.

Optionally, the media file is obfuscated using optical obfuscation.

Optionally, the method further comprises deleting any copies of the text string after it has been converted.

Optionally, the text string is converted to a plurality of media files, such that when the plurality of media files is processed according to a presentation function and passed to the output, the password information is presented to a user.

Optionally, the function is a dynamic composition function.

Optionally, the plurality of media files is stored in the memory such that it is protected by the master password.

Optionally, the method further comprises storing the presentation function in the memory such that it is protected by the master password.

According to the invention in a second aspect, there is provided a non-transitory computer readable medium comprising computer readable code configured, when read by a computer, to carry out the method described above.

According to the invention in a third aspect, there is provided a method for retrieving password information stored in a memory of a computer device. The stored password information may be protected by a master password. The method may comprise receiving a request for password information and a master password for retrieving the requested password information. The method may further comprise obtaining from the memory a stored media file corresponding to the requested password information using the master password. The method may further comprise passing the obtained media file to an output such that the password information is presented to a user.

Optionally, the media file comprises an image file and rendering the image file to a display comprises rendering a background such that the background comprises linear distortion, and rendered the image file onto the background.

Optionally, the media file comprises an image file and passing the image file to an output comprises rendering the image file to a display by rendering the image such that the password information is linearly distorted.

Optionally, the securely stored media file is obfuscated by an obfuscation key, the method further comprises obtaining the obfuscation key from a memory. Optionally, the method further comprises and de-obfuscating the media file based on the obfuscation key.

Optionally, the media file is obfuscated using mathematical obfuscation.

Optionally, the media file is obfuscated using optical obfuscation.

Optionally, obtaining the media file comprises storing the obfuscated media file at an area of a runtime memory. Optionally, de-obfuscating the obfuscated media file comprises storing the de-obfuscated media file to the area of the runtime memory. Optionally, the method further comprises clearing the area of the runtime memory when the de-obfuscated media file is no longer required.

Optionally, obtaining the stored media file from memory comprises deriving an encryption key from the master password for decrypting the media file.

Optionally, the derived encryption key is derived using password based key derivation function 2.

Optionally, obtaining the stored media file from memory comprises deriving an encryption key from the master password. Optionally, obtaining the stored media file from memory comprises decrypting a further encryption key using the derived encryption key. The further encryption key may be randomly generated and for decrypting the media file.

Optionally, the method comprises obtaining from the memory a plurality of stored media files.

Optionally, the method further comprises processing the plurality of media files in accordance with a presentation function and passing the resultant data to the output such that the password information is presented to a user.

Optionally, the presentation function is stored in the memory such that it is protected by a master password, and further comprising obtaining the presentation function from the memory.

According to the invention in a fourth aspect, there is provided a non-transitory computer readable medium comprising computer readable code configured, when read by a computer, to carry out the method described above.

According to the invention in a fifth aspect, there is provided a system for managing password information securely stored in a memory of a computer device. The system may comprise a memory configured to store securely a media file corresponding to password information and protected by a master password. The system may also comprise a processor in electrical communication with the memory. In a write mode, the processor may be configured to receive a text string corresponding to password information. The processor may also be configured to convert the text string to a media file. When the media file is passed to an output the password information may be presented to a user. The processor may be further configured to store the media file in the memory such that it is protected by the master password. In a read mode, the processor may be configured to receive a request for password information and a master password for retrieving the requested password information. The processor may be further configured to obtain from the memory a stored media file corresponding to the requested password information using the master password. The processor may be further configured to pass the obtained media file to an output such that the password information is presented to a user.

According to the invention in a sixth aspect, there is provided a device for managing password information securely stored in a memory. The stored password information may be protected by a master password. The device may comprise a processor configured to store a media file corresponding to password information on a memory. The processor may be further configured to retrieve a media file corresponding to password information from a memory. In a write mode, the processor may be configured to receive a text string corresponding to password information. The processor may be further configured to convert the text string to a media file. When the media file is passed to an output the password information may be presented to a user. The processor may be further configured to store the media file in a memory such that it is protected by the master password. In a read mode, the processor may be configured to receive a request for password information and a master password for retrieving the requested password information. The processor may be further configured to obtain from a memory a stored media file corresponding to the requested password information using the master password. The processor may be further configured to pass the obtained media file to an output such that the password information is presented to a user.

According to the invention in a seventh aspect, there is provided a method for securely storing password information in a memory of a computer device, the stored password information being protected by a master password, the method comprising: launching a password manager application; receiving a text string corresponding to password information input to the password manager application by a user; converting the text string to a media file, such that when the media file is passed to an output the password information is presented to a user; and storing the media file in the memory such that it is protected by the master password.

BRIEF DESCRIPTION OF THE FIGURES

Exemplary embodiments of the invention are herein described with reference to the accompanying drawings, in which.

DESCRIPTION

Figure 1:
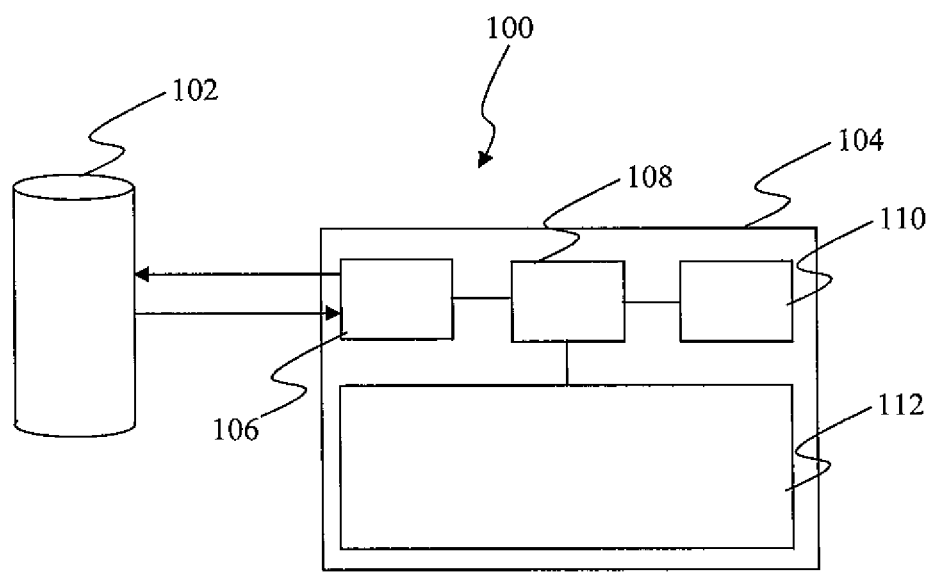
FIG. 1 is a schematic representation of a system for managing data.

The inventors have appreciated that recent technological advancements have made it possible to implement web based applications, which look and behave like device native applications, but which are actually implemented using open web technologies such as HTML, CSS and JavaScript. Generally, the native part of these web applications is the packaging for installation and possibly a native device interface, which allows the application to interact with the specific device.

An advantage of web applications is that, as they are implemented using web technologies, they are compatible across a wide range of devices with small effort when compared to native implementations, which require specifically written native code to operate.

It is noted that one can develop web applications that are fully functional when online as well as when offline. Therefore, the term "web applications" and "web technologies will be understood, when used herein, to encompass applications that are operational as standalone applications without networks and/or network servers and applications that are operational over communications networks.

Traditionally, web applications have been seen as inherently unsecure and have therefore not been used to implement password manager applications. A perceived drawback of web applications is linked to the browser itself, which may be open to a wide range of attacks. This has been widely demonstrated in the information security community and various InfoSec conferences.

Furthermore, emerging standards such as HTML5 and native JavaScript extension interfaces may be prone to new types of attacks that have not yet been disclosed or researched.

However, the inventors have appreciated that web technologies may be used to implement password manager applications while mitigating or overcoming security issues.

Generally, disclosed herein is a layered method to increase security against computer based attacks for stealing passwords from a password manager software application. In particular, the layered method may be useful when the password manager is embodied in web technologies. The method may be generalized so that it is not bound by web technologies only.

Typically, a password manager is based on an encrypted database of data entries relating to password information. The data entries are each protected by a master password that is used to restrict access to the entries in the database. It is noted that the master password may be used simply to permit access to the data, or as an encryption key to decrypt the data entries as they are retrieved from the database. When a user requires access to the database, he is requested to enter the master password. On entering the correct master password, the user is granted access to the contents of the database.

As used herein, the term "database" may encompass one single file capturing data and any index information and logic for accessing the data, and may also encompass series of individual files capturing specific parts of the database.

The user is then able to select some password information to be displayed on screen. For example, if the user requires password information relating to a specific website, online account or other secure information, a request is entered via the password manager application. The information is then decrypted in runtime memory and rendered (e.g. rasterized) to a screen. Typically, this results in a plain text copy of the password being stored in runtime memory. When the user no longer requires the password to be displayed and the password view is therefore closed, the fate of the copy of the password in runtime memory may be unknown. It may be that the password manager application overwrites the plain text password in runtime memory. However, it may be that a residual copy of the password remains in runtime memory, which presents a security risk.

The term "plain text" encompasses sequential data readable by a computer as textual material with little processing. The data itself may be structured to represent text characters directly as, for example, a text string. Plain text data may be structured in ASCII format. When saved to a memory or database, plain text data is identifiable as such and may be easily read by a computer.

Web technologies typically use high level computing languages that limit control over runtime memory and therefore represent an increased risk in terms of residual password copies.

In a native application (i.e. an application written in a computing language native to a particular device) the runtime memory space used by a password manager application process is protected. This prevents other processes from accessing information stored by the password manager application in the runtime memory. As a result, the runtime environment can be considered more secure. In addition, the native language used in a native application may allow a high degree of control over runtime memory. Therefore, the password manager application is able to ensure that no residual copies of passwords remain in runtime memory when they are no longer required.

Web technologies are different. There may be only a single process in runtime memory and the address space of that single process may be shared across a plurality of web pages and web apps, all running at the same time. Without proper context separation, different web pages and applications can access each others' runtime memory resources.

The inventors have appreciated that, if a password manager application is implemented as a web app, storing password information in plain text in runtime memory may carry a security risk. In addition to runtime access issues, the high level programming languages used (e.g. JavaScript) may not provide the means (e.g. functions and subroutines) to overwrite specific areas of runtime memory containing password information. Therefore, even if one wished to, it may not be possible to prevent residual copies of passwords in runtime memory. This may leave room for attacks, in which an attacker scans memory for plain text patterns to look for passwords.

The inventors have realised that the problems identified above may be mitigated or overcome if password information is stored not as text, but as non-textual data. For example, the password information may be stored as a media file such as an image file, an audio file, or as an animation, motion path or stencil. When the password information is stored as a media file, it does not look like plain text to an attacker computer and cannot therefore be easily searched to determine text characters of the password information. However, when the media file is passed to an output, such as a display or loudspeaker, and presented to a user, the user is able to determine the text characters making up the password.

The specific example of storing password information as an image file is used herein. However, the exemplary methods and apparatus may be implemented using other types of media file. Further, in exemplary methods and apparatus, a plurality of media files may be stored and, when processed according to a presentation function, may be output to a display to present the password information to a user. The presentation function may be predefined. Alternatively, the presentation function may be dynamically determined and may be a dynamic composition function.

Further, the inventors have appreciated that an additional degree of security may be introduced by the application of linear distortions (such as motion blur, waves etc.) to the background of an image before rendering the password text to the image. Alternatively, linear distortions, may be applied to the entire image (i.e. the background and the text of the image) after password text is rendered on the background. This makes optical character recognition and computer interpretation of the password data even more difficult. However, if the distortions are applied after the text is rendered on a background the system should function in a way where the distorted end result image is readable by a human.

If such linear distortions are applied, it may also act as a safeguard against automated modifications (or attacks) of the image. Implementing computer software (for example, by an attacker) that replaces the text while honouring the applied linear distortions to make them look smooth is difficult. Therefore, trivial editing of the image would produce non-linear elements to the image. That is, the edited portions of the image would not flow with the linear distortions of the rest of the image. These can be observed by a user as discontinuous elements in the image. This is somewhat analogous to wax seals used in stamped envelopes—if the seal is broken (or the linear distortions are discontinuous), someone has tampered with the letter (or the image).

Some operating systems may introduce caching behaviour in order to improve overall system performance when handling images. The inventors have appreciated that caching may create unwanted copies of the original image data that contains the rendered password text. In order to overcome the caching effect, image content may be further obfuscated. With this obfuscation any unintentional copies of the original image will not contain human readable information per se. The password that is rendered in an image is readable only when a correct de-obfuscation method is applied with any associated de-obfuscation key(s). The obfuscation method can be either mathematical, where, for obfuscation, information is scrambled according to specific pixel level algorithm, the information being unscrambled for de-obfuscation. Alternatively or in addition, the obfuscation method can be based on a specific optical composition of one (or more) images applied on top of an original image to be obfuscated. The main idea is that copies of a source image data are neither human nor computer readable as is. They require a further component (e.g. de-obfuscation) to convert them to human readable format.

Therefore, the systems disclosed herein are able to mitigate or overcome problems associated with how different runtime environments (e.g. different JavaScript engines) store, clean and/or conceal text based data differently in memory. Further, if an attacker wishes to modify the data corresponding to the password information, they must manipulate the non-textual data, which is far more difficult. If the non-textual data comprises image data, an attacker must determine the parts of the image to manipulate, which may be difficult as image analysis and recognition would first be required.

In this way, when a data entry corresponding to password information is retrieved from a database by a password manager application, copies of the password in runtime memory are not in plain text, but are non-textual data suitable for presentation to a user. For example, the non-textual data may be a bitmap that may be rendered to a screen. Reading password information from such a rendered image is much more difficult for an attacker computer than reading it from plain text data. However, user interpretation of this information is no different from interpretation of plain text information.

Referring to FIG. 1, a system 100 comprises a database 102 in electrical communication with a processing unit 104. The database may be implemented as an area of memory, such as RAM or Flash, or as a hard drive. The processing unit comprises a database interface 106, which is in electrical communication with the database 102 to allow data to be stored on the database 102 and retrieved from the database 102. The interface is also in electrical communication with a processor 108. The processor 108 is in electrical communication with a runtime memory 110 and a user interface 112. The user interface may, for example, comprise an output, such as a display and/or a loudspeaker, and a means for inputting information to the processing unit 104.

The system 100 may form part of a single device. Alternatively, the system may be distributed across a plurality of devices. Connections between the elements of the system 100 may be provided by a communications network, such as an intranet or the Internet.

For the avoidance of doubt, it is noted that the term "database" encompasses a permanent or semi-permanent data storage facility. A database may be arranged to hold data for long periods (e.g. days, months or years) and to provide access to the stored data when it is required by a user. A database may further permit restricted access to stored data by means of a password. A database is distinct from "runtime memory" or "cache memory", which encompasses a temporary data storage facility. Runtime memory may be used to store data useful to a particular application while it is running, to obviate the need to continually retrieve data from a permanent or semi-permanent data storage (e.g. a database). Runtime memory and cache memory may be transparent in that it may be freely accessible to any third party application.

The system 100 is configured to launch a password manager application that displays a graphical user interface to a user. The graphical user interface may be provided via a display of the user interface 112. Generally, and as explained above, the password manager application allows a user to access a database 102 of stored password information under the control of a master password. The master password may be used simply to permit access to the data, as an encryption key to decrypt the data entries as they are retrieved from the database, or the master password may be used to derive an encryption key for decrypting data entries. Key derivation can be performed, for example, using password based key derivation function 2 (PBKDF2) with the master password. Additionally or alternatively, key derivation may be performed using salted hash functions. Further, in exemplary methods and apparatus, the derived key may be used to access a further encryption key that may be randomly generated and therefore stronger than the original master password. The further encryption key may be used to encrypt the data. Then, the further encryption key may be encrypted with the derived (from the master password) key. If the derived key is derived correctly, then the further key can be decrypted using the derived key and used to access the database.

Therefore, by entering the master password, a user gains access to the database 102 via the processing unit 104. The user may select password information they wish to view and the relevant entry in the database 102 is obtained. Alternatively, the user may input password information via the user interface 112, which is then stored on the database 102. The management of password information, including storing and retrieving the password information, may be undertaken while the password manager application is running.

Figure 2:
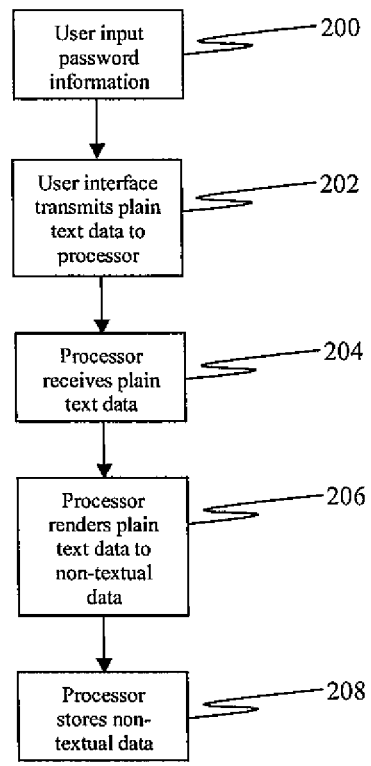
FIG. 2 is a flow diagram showing a method for storing data on a database.

Referring to FIG. 2, in a write mode, a user inputs 200 password information via the user interface 112. The password information comprises a text string of a plurality of text characters, which represents a password, log-in details, documents, communications or other secret information (termed "password information" for the purposes of clarity). The user interface generates plain text data corresponding to the text string and transmits 202 the plain text data to the processor 108. The processor 108 receives 204 the text string as plain text data. The processor 108 then converts (or encodes) 206 the plain text data to an image file for rendering to a display to display the text string to a user. The processor 108 stores 208 the image file in the database 102 via the database interface 106. The image file is stored with password protections. For example, the stored image file is password protected by the master password.

In some embodiments, the text string may be stored on a plurality of image files. Further, a plurality of text strings may be encoded into a single image file, wherein rendering the image file to a display displays all of the plurality of text strings to a user.

In exemplary methods and apparatus, the text string may be stored as a plurality of media files. The media files may, for example, specify the lighting information and timing information etc. required to present the password information as, for example, an animation or an audio-visual composition.

The plurality of media files may be processed together according to a presentation function and then output to present the password information. In specific exemplary methods and apparatus, the presentation function may be stored in the password manager memory under the protection of the master password.

In exemplary methods and apparatus, the function may be a dynamic composition function. For example, a specific random element to the final presentation may be generated when the plurality of media images is produced. In such methods, the presentation function may be generated at the same time as the media files are generated.

The method may utilise polymorphic or metamorphic executable code. Presentation logic may be morphed into code that can present the generated media files at the same time as the media files are generated. Ultimately, code carries out the presentation but the concrete executable code (the presentation function) may mutate over time. Therefore, in some embodiments the presentation function may be pre-defined. However, in other embodiments, the presentation function may be dynamically generated as the media files are processed.

Figure 3:
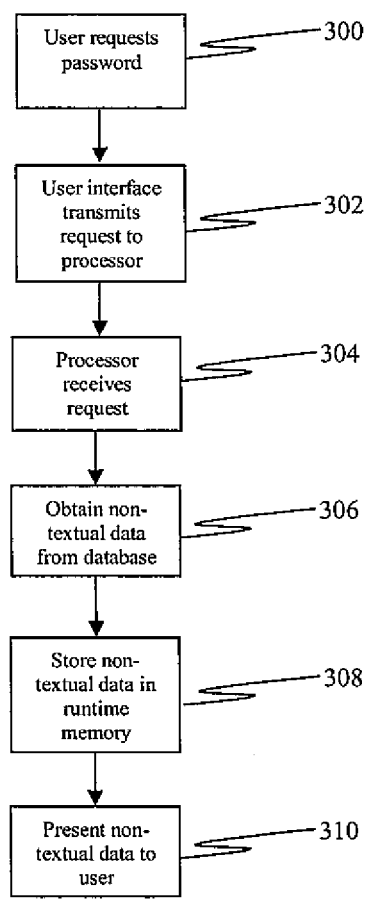
FIG. 3 is a flow diagram showing a method for retrieving data from a database.

Referring to FIG. 3, in a read mode, a user requests 300 password information via the user interface 112. The password information may be represented by a text string. The user interface transmits 302 the request to the processor 108. The request is received 304 by the processor 108. The processor 108 obtains 306 an image file corresponding to the text string of the requested password information from the database 102 via the database interface 106. The processor 108 stores 308 the image file in the runtime memory 110 from where it is rendered to a display of the user interface 112 for display 306 to a user.

When it is presented to a user, the image file allows the user to determine the text characters of the password information. However, when it is stored in a database 102 or in a runtime memory 110, the image file is difficult for a computer to interpret to determine the text characters of the password information. That is, the image file is encoded such that an attacker computer interprets the data an image file and not a text string. If an attacker computer processes the image file, an image is produced, from which it is difficult for the attacker computer to determine the characters of the text string. In contrast, plain text data is recognisable by an attacker computer as such and may be directly converted to a text string, from which an attacker computer may easily determine the characters of the text string.

Using the method disclosed above, any copies of the password that are made in runtime memory 110 are protected from attacks in which an attacker uses a computer to search through a section of runtime memory 110 to search for password information. As the password information is stored as image data, it is difficult for the attacker computer to identify and determine the password information.

In a particular system, the image file may be a bitmap. The image file that is stored on the database 102 may be retrieved and rendered to a display, which forms part of the user interface 112. When the image file is rendered to the display, the text characters of the password information are displayed to a user, who is therefore able to determine the text characters of the password information simply by reading them.

In other exemplary methods and apparatus, a plurality of media files may be stored on the database 102. The plurality of media files may comprise, for example, lighting information or timing information etc. required to present the password information to the user as, for example, an animation and/or an audio-visual composition. The plurality of media files is obtained from the database and processed together according to a presentation function. The processing may output a file that, when passed to an output, such as a display and/or an audio device, presents the password information to the user.

When handling the image file, the processors of exemplary systems may be configured to prevent caching of the image file. Alternatively or in addition, the processors may be configured to use random names when storing image file in the database and/or the runtime memory.

In further exemplary systems 100, the elements of the system 100 may be configured such that data stored in the database 102 are obfuscated using an obfuscation key. Such exemplary systems 100 are explained below, with reference to FIGS. 1, 4 and 5. The features of these exemplary systems 100 are described below in conjunction with the features of the exemplary systems described in FIGS. 1 to 3, i.e. to obfuscate image files. However, they may also be implemented independently to obfuscate any data to be stored on the database.

Figure 4:
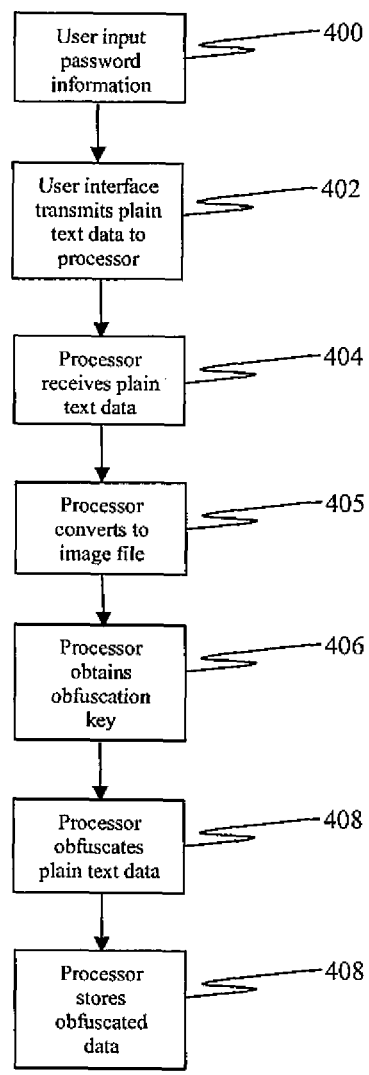
FIG. 4 is a flow diagram showing a method for storing data on a database.

Referring to FIGS. 1 and 4, exemplary processors 108 may be configured to obfuscate image files corresponding to password information (as explained above) and to store the obfuscated image files on the database 102. Such exemplary processors 108 provide security against user interfaces, such as web browsers, that cache data retrieved from the database 102, as the cached data is obfuscated and cannot easily be read by an attacker computer. Such exemplary systems 100 may be particularly useful when the processor 108 is not able to overwrite and/or clear specific areas of the runtime memory 110.

Obfuscation may be achieved based on an obfuscation key, which is a random key that may be stored on the database 102.

Referring to FIG. 4, in a write mode, a user enters 400 password information to the processing unit 104 via the user interface 112. The user interface 112 generates a text string of plain text data and transmits 402 the password information as plain text data, which are received 404 by the processor 108. The processor converts 405 the text string to an image file as explained above. The processor 108 then obtains 406 an obfuscation key from the database 102 and obfuscates 408 the image file using the obfuscation key. The processor 108 then stores 410 the obfuscated image file on the database 102. The stored obfuscated image file is password protected as explained above.

By obfuscating the image file corresponding to the text string of the password information before it is stored on the database 102, the system 100 provides an image file that, when retrieved from the database 102 and stored in runtime memory 110, is secured against attacks that search runtime memory for password information. That is, because the image file is obfuscated, an attacker computer will find it more difficult to recognise the image file as corresponding to text characters and, therefore, will find it more difficult to determine the text characters of the password information. As a result, if residual copies of image files retrieved from the database 102 remain in runtime memory 110 after they are required, they are more challenging for an attacker computer to locate and extract information from.

Figure 5:
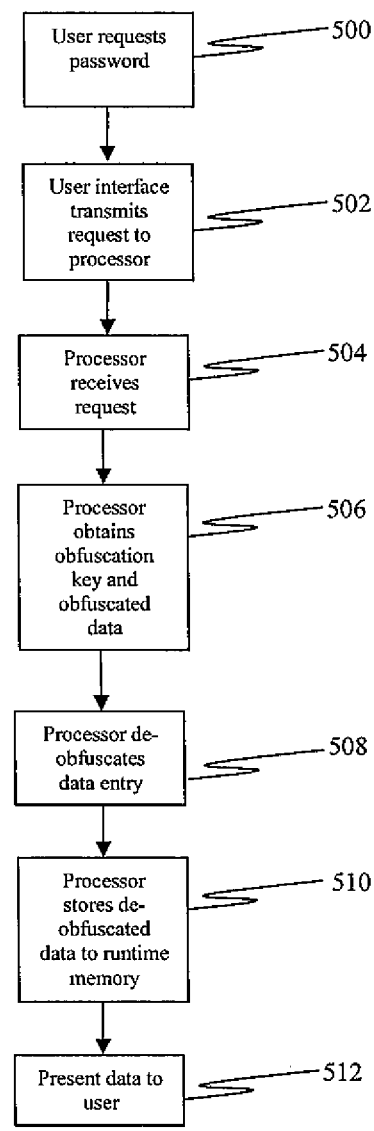
FIG. 5 is a flow diagram showing a method for retrieving data from a database.

Referring to FIG. 5, in a read mode, a user selects 500 password information that the user wishes to view via the user interface 112. The user interface 112 generates and transmits 502 a request, which is received 504 by the processor 108. The processor obtains 506 the obfuscated image file and the obfuscation key from the database 102. The processor 108 de-obfuscates 508 the obfuscated image file based on the obfuscation key and renders the image file to a display of the user interface 112 for display to the user.

Operating systems and web browsers may create transparent caches of image (or other non-textual) data to accelerate system response times. When sensitive information (e.g. passwords) is encoded in an image, this may create un-intentional copies of the sensitive information.

Specific exemplary systems may be configured to control the de-obfuscation of an image file, such that better control over the caching of image files is provided. In such exemplary systems, a specific area in runtime memory can be identified on which the obfuscated image file is written. Then, the de-obfuscated image file is written to the same runtime memory area. Ultimately, the identified area of runtime memory is overwritten once the de-obfuscated image file is no longer required. This way, there are no residual copies of the image file left in runtime memory.

For example, in HTML5 there is a 2D <canvas> element that provides simple two dimensional raster for rendering visual (or image) data. Alternatively or in addition, WebGL may be used to render images as textures on top of 3D objects, thereby achieving the same effect. Typically, browser manufacturers try to have this space hardware accelerated, which means that it occupies a specific (scarce) runtime memory area. When the obfuscated image file is first written to this area, it reserves the runtime memory space required. The de-obfuscated image file is written to the same canvas (runtime memory space) to produce the de-obfuscated image file. This should not create un-intentional copies of the image file, nor occupy any other memory space, because the same canvas data that already exists is manipulated. At the end of the process, the canvas data is overwritten (or cleared), which results in no residual copies of the original image file left in runtime memory.

In exemplary systems 100, the processor 108 is configured to create a real time rendered context (like an HTML5 canvas that is not cached) in the runtime memory 110 and stores the de-obfuscated image file to the real time rendered context.

In further exemplary systems 100, the features described in FIGS. 4 and 5 may be implemented independently. That is, the processor 108 may be configured to obfuscate data other than image files (e.g. the plain text data itself) and store them on the database 102.

In a particular exemplary system 100, and as described above, the processor 108 may be configured to implement a linear distortion technique when converting the text string of the password information from plain text data to an image file. The linear distortion technique may adapt the image file such that the text displayed in the image is distorted. A human user can read the distorted text information, but a machine finds reading the distorted text more difficult.

Figure 6:
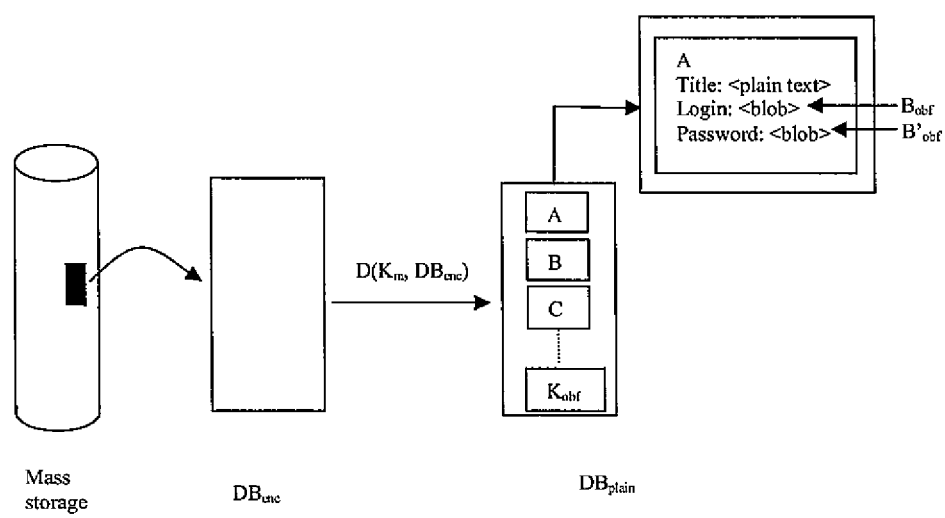
FIG. 6 shows a schematic illustrating mathematics for implementing a system for managing data.

FIG. 6 illustrates mathematics for an implementation of an exemplary system for managing data. Where:
DBenc=encrypted master database
e(k, d)=encryption function where k=encryption key and d=data to encrypt
d(k', d')=decryption function where k'=decryption key and d'=data to decrypt
Km=user's master key (or password)
DBplain=decrypted master database
Kobf=obfuscation key
XE[A, B, C, . . . ]=data entries corresponding to password information records
BX=blob|XE[obf, plain]
e(Km, DBplain)→DBenc
d(Km, DBenc)→DBplain
e(Kobf, Bplain)→Bobf
d(Kobf, Bobf)→Bplain 1) Mass storage contains DBenc
2) When lower case 'd' (decryption function, functions are lower case in maths) is applied with Km over DBenc it produces DBplain
3) DBplain is used to address individual entries Km can (again) be the master password or a derived key. Also Kobf can be applied to all data entries A, B, C etc., or KobfA, KobfB, KobfC etc may be used for each record respectively.

The schematic described above and in FIG. 6 relates to symmetric cryptography. Exemplary systems and methods may be implemented using an asymmetric cryptography.

In exemplary systems, the database may be hosted on a network, such as a LAN, WAN, intranet or the Internet. In such systems, the application logic may be on the device. That is, the device is configured to undertake the methods disclosed herein and encrypted data is transferred over the network.

For example, exemplary systems may transmit raw encrypted data blobs as set out in the exemplary method below:
A first device, A, writes a record to a database
The database is encrypted with a master password
Device A sends the encrypted database to a server for synchronisation
A second device, B, synchronises encrypted data from the server
Device B decrypts the database whilst it is on device B using a master password
Device B reads an entry from the database In the exemplary method disclosed above, all create, read, update and delete operations happen on the device B, but the network is used for transmitting and synchronising encrypted data. Further, all keys remain on devices A and B and are not transmitted over a network.

The methods and systems disclosed above use the specific example of a password manager application for illustrative purposes only. It is noted that the methods and systems may also be used in other applications.

The skilled person will be able to envisage other embodiments without departing from the scope of the appended claims.

The invention claimed is:

1. A method for securely storing password information in a memory of a computer device using a password manager application, the stored password information being protected by a master password that allows access to the password manager application, the method comprising:
   receiving a text string corresponding to password information input to the password manager application by a user;
   creating at least one image file of the text string, such that when the at least one image file is passed to an output the password information is presented to a user;
   obfuscating the at least one image file using an obfuscation key; and
   storing the obfuscated at least one image file in the memory via the password manager application such that it is protected by the master password.

2. A method according to claim 1, wherein storing the at least one image file comprises storing the at least one image file in a database, wherein access to the database via the password manager requires input of the master password to the computer device.

3. A method according to claim 1, wherein the at least one image file comprises an animation file representation of the password information.

4. A method according to claim 1, wherein protecting the at least one image file with the master pas'sword comprises deriving an encryption key from the master password for encrypting the at least one image file.

5. A method according to claim 4, wherein derivation of the encryption key is undertaken using password based key derivation function 2.

6. A method according to claim 1, wherein protecting the image file with the master password comprises deriving an encryption key from the master password, randomly generating a further encryption key, encrypting the at least one image file using the further encryption key and encrypting the further encryption key using the derived encryption key.

7. A method according to claim 1, further comprising linearly distorting the at least one image file before it is stored.

8. A method according to claim 1, wherein the at least one image file is obfuscated using mathematical obfuscation.

9. A method according to claim 1, wherein the at least one image file is obfuscated using optical obfuscation.

10. A method according to claim 1, further comprising deleting any copies of the text string.

11. A method according to claim 1, wherein a plurality of image files of the text string are created, such that when the plurality of image files is processed according to a presentation function and passed to the output, the password information is presented to a user.

12. A method according to claim 11, wherein the function is a dynamic composition function.

13. A method according to claim 11, wherein the plurality of at least one-image files is stored in the memory such that it is protected by the master password.

14. A method according to claim 11, further comprising storing the presentation function in the memory such that it is protected by the master password.

15. A non-transitory computer readable medium comprising computer readable code configured, when read by a computer, to carry out the method of claim 1.

16. A system for managing password information securely stored in a memory of a computer device using a password manager application, the system comprising:
a memory configured to store securely an image file corresponding to password information and protected by a master password that allows access to the password manager application;
a processor in electrical communication with the memory, wherein, in a write mode, the processor is configured to:
receive a text string corresponding to password information input to the password manager application by a user;
create at least one image file of the text string, such that when the at least one image file is passed to an output the password information is presented to a user;
obfuscate the at least one image file using an obfuscation key; and
store the obfuscated at least one image file in the memory via the password manager application such that it is protected by the master password,
and wherein, in a read mode, the processor is configured to:
receive a request for password information and a master password for retrieving the requested password information;
obtain from the memory via the password manager a stored image file corresponding to the requested password information using the master password, wherein the stored image file is obfuscated by an obfuscation key;
obtain the obfuscation key from a memory;
de-obfuscate the image file based on the obfuscation key; and
pass the de-obfuscated image file to an output such that the password information is presented to a user.

17. A device for managing password information securely stored in a memory using a password manager application, the stored password information being protected by a master password that allows access to the password manager application, the device comprising:
a processor configured to store an image file corresponding to password information on a memory and to retrieve the image file corresponding to password information from a memory,
wherein, in a write mode, the processor is configured to:
receive a text string corresponding to password information input to the password manager application by a user;
create at least one image file of the text string, such that when the at least one image file is passed to an output the password information is presented to a user;
obfuscate the at least one image file using an obfuscation key; and
store the obfuscated at least one image file in a memory via the password manager application such that it is protected by the master password, and wherein, in a read mode, the processor is configured to:
receive a request for password information and a master password for retrieving the requested password information;
obtain from a memory via the password manager application the stored at least one image file corresponding to the requested password information using the master password, wherein the stored at least one image file is obfuscated by an obfuscation key;
obtain the obfuscation key from a memory;
de-obfuscate the at least one image file based on the obfuscation key; and
pass the de-obfuscated at least one image file to an output such that the password information is presented to a user.

18. A method for securely storing password information in a memory of a computer device using a password manager application, the stored password information being protected by a master password that allows access to the password manager application, the method comprising:
launching the password manager application;
receiving a text string corresponding to password information input to the password manager application by a user;
creating at least one image file of the text string, such that when the at least one image file is passed to an output the password information is presented to a user;
obfuscating the at least one image file using an obfuscation key; and
storing the obfuscated at least one image file in the memory such that it is protected by the master password via the password manager application.

* * * * *

UNITED STATES PATENT AND TRADEMARK OFFICE
CERTIFICATE OF CORRECTION

PATENT NO. : 9,268,713 B2  
APPLICATION NO. : 14/075249  
DATED : February 23, 2016  
INVENTOR(S) : Torkkel Page 1 of 1

It is certified that error appears in the above-identified patent and that said Letters Patent is hereby corrected as shown below:

Claims

Claim 13, col. 13, line 30 "at least one" should be deleted.

Signed and Sealed this
Seventeenth Day of May, 2016

Michelle K. Lee
*Director of the United States Patent and Trademark Office*